(No Model.)

E. T. STARR.
LATHE HEAD.

No. 254,719.　　　　　　　　　　Patented Mar. 7, 1882.

WITNESSES
Wm A. Skinkle
Chauncey N. Dutton

INVENTOR
Eli T. Starr,
By his Attorneys
Baldwin, Hopkins & Peyton

UNITED STATES PATENT OFFICE.

ELI T. STARR, OF PHILADELPHIA, PENNSYLVANIA, ASSIGNOR TO THE S. S. WHITE DENTAL MANUFACTURING COMPANY, OF SAME PLACE.

LATHE-HEAD.

SPECIFICATION forming part of Letters Patent No. 254,719, dated March 7, 1882.

Application filed January 24, 1882. (No model.)

*To all whom it may concern:*

Be it known that I, ELI T. STARR, of the city and county of Philadelphia, in the State of Pennsylvania, have invented certain new and useful Improvements in Lathe-Heads, of which the following is a specification.

My invention relates more especially to the heads of lathes of the class employed for light work—such, for instance, as the office-work of dentists.

The objects of my invention are to improve lathe-heads, in order to render them more efficient, durable, and steady in their operation, and also to permit of the rapid interchange of chucks, so as to enable tools or implements of different capacity to be readily substituted and driven by the lathe.

The subject-matter claimed is particularly pointed out at the close of the specification.

Figure 1:
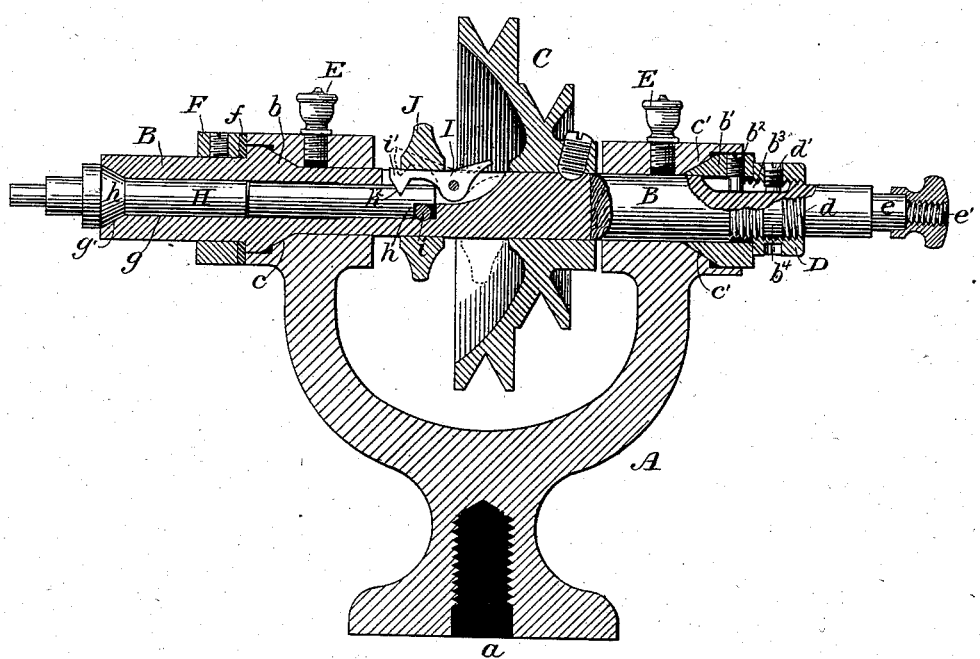
Figure 2:
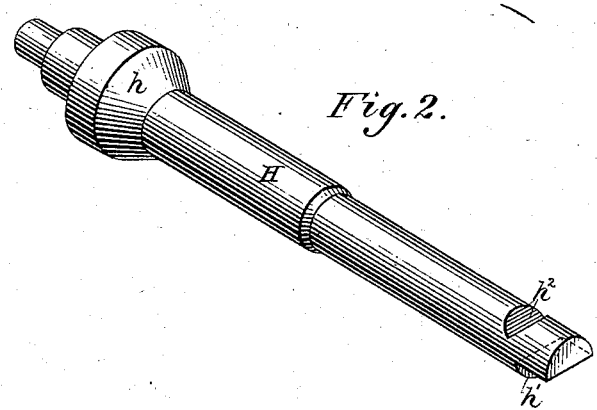

In the accompanying drawings, Figure 1 is a vertical longitudinal central section through my improved lathe-head, and Fig. 2 is a perspective view of a chuck or tool-carrying shank adapted to one end of the driven spindle of said lathe-head.

I have deemed it unnecessary to show in the drawings the parts of the lathe which impart motion to the pulley and spindle of the lathe-head, as these may be such as are in common use suitable for the purpose.

The frame A of the head may be secured to the table of the lathe or to its support by suitable fastenings—such, for instance, as a clamp-screw, (not necessary to be shown,) screwing into the threaded socket $a$ of the frame. Said frame is branched so as to have two upright arms, provided at their upper ends with bearings for the spindle B of the head. Said spindle is fitted to rotate in said bearings, and is revolved by the driving-belt of the lathe, which passes over the cone-pulley C, firmly fixed or keyed upon the spindle. I prefer that a cone-pulley should be used instead of a plain pulley, in order that the spindle may be driven at different speeds.

In order to compensate or take up the wear of the spindle B and of its bearings, so as to compel the spindle always to run true and steadily, I provide the spindle with cone-journals $b$ $b'$, which fit corresponding cone-seats in the bearings. The cone-journal $b$ (which I preferably form integral with the spindle) fits its corresponding bearing, $c$, snugly, while the cone-journal $b'$ also fits its bearing $c'$ nicely. Said journal $b'$ is formed by a cone-collar fitted nicely upon the spindle, with its cone end seated in the cone-bearing $c'$ of the head. This cone-collar is adjustable longitudinally upon the spindle, so as to take up or compensate for all wear of the journals or bearings, and is prevented from turning relatively to said spindle by a guide-screw, $b^2$, which passes through the collar. The inner end of said screw $b^2$ enters a longitudinal groove, $b^3$, in the spindle, which groove, it will be seen, while it permits adjustment of the collar longitudinally, prevents it from turning upon the spindle. The adjustable cone-collar is held tightly to its cone-seat by means of a screw-ring, D, fitted upon threads $d$, cut upon the spindle, the said ring being firmly screwed up against the cone-collar, and then locked to the spindle by a set or jam screw, $d'$, which presses or bites upon the spindle in a circumferential groove, $b^4$, therein.

Suitable oil-cups, E E', are preferably screwed into the bearings of the spindle B, so as to distribute oil to the bearings to lubricate them.

In order to make a tight joint, I interpose between an adjustable ring, F, and the annular shoulder formed by the bearing $c$ and the termination of the cone-journal $b$ a leather or other suitable washer, $f$.

At one end of the spindle B, I have shown a plain surface, $e$, and a male screw, $e'$, to receive internally screw-threaded chucks for carrying wheels, brushes, &c., in the usual way, while at the opposite end of the spindle I have provided a socket, $g$, to receive the shanks of chucks or carriers, so that the shanks of said chucks or carriers may be readily inserted in and removed from the spindle, while when inserted in the spindle and in operation they will be securely locked therein, both as against independent turning and endwise movements. The mouth of the socket $g$ is preferably coned or flaring, as at $g'$, and the shanks H of the chucks or carriers are provided with corresponding coned shoulders, $h$, to fit said mouth. Said shank H is also provided with a flattened or driving inner end, $h'$, which engages a cross-pin or driving-surface, $i$, in the socket of the spindle. The shank, therefore, is positively driven with the spindle when said spindle is rotated. Said shank H is also provided with a transverse locking notch or groove, $h^2$, preferably of the V shape shown, and this notch is engaged by the correspondingly-shaped locking end $i'$ of a catch, I, pivoted in a longitudinal recess in the spindle B, as clearly shown in Fig. 1. Said locking-catch I is provided with a bent rear end or raised projection, $i^2$, and said catch is controlled by means of a sliding ring, J, whereby it will be evident that if said ring J is in the position shown in full lines in Fig. 1 the locking end $i'$ of the catch I will be depressed and the shank H locked in the socket of the spindle, while when said ring is moved into the recess of the cone-pulley C, as shown in dotted lines in said figure, the said catch will be rocked upon its pivot, so as to throw the locking end $i'$ thereof out of the locking notch or groove of the shank, and said shank will thereby be free to be withdrawn for the insertion of another shank, if that is required.

It will thus be seen that by a simple organization of spindle, catch, and shank, the shank may be readily inserted in or withdrawn from the spindle-socket, while when in use it will be positively driven with the spindle.

It will also be evident that owing to the cone-shoulder $h$ on the shank H said shank will be held firmly in the socket of the spindle, and will not be allowed loose movement therein, this being due to the fact that by the wedging of the locking end $i'$ of the catch I into the cross-notch $h^2$ of the shank said shank will be drawn or pulled into the socket, and its cone-shoulder be forced firmly into the correspondingly-shaped mouth of said socket.

I claim as my invention—

1. The combination, substantially as hereinbefore set forth, of the lathe-head frame, the bearings of said frame, the spindle fitted to turn in said bearings, the cone-journals of said spindle, one of which is formed by a longitudinally-adjustable cone-collar, and the screw-ring working upon said spindle to hold said adjustable cone-collar to its seat in its bearing.

2. The combination, substantially as hereinbefore set forth, of the lathe-head frame, the bearings of said frame, the socketed spindle fitted to rotate in said bearings, the pulley to drive said spindle, the pivoted latch to lock a shank in said socket as against endwise movement, and a sliding ring to control said latch.

3. The combination, substantially as hereinbefore set forth, of the lathe-head frame having the branching arms, the spindle fitted to turn in bearings in said arms, the pulley having a recess in its side keyed upon said spindle between said arms, the latch mounted in a recess in said spindle between said pulley and one of the bearings of said spindle, and the device to control the movement of said latch.

In testimony whereof I have hereunto subscribed my name this 23d day of January, A. D. 1882.

ELI T. STARR.

Witnesses:
E. EUGENE STARR,
SAM. E. STARR.